Feb. 27, 1923.                              1,446,975
J. E. KESSLER
VALVE GRINDER
Filed Mar. 31, 1922
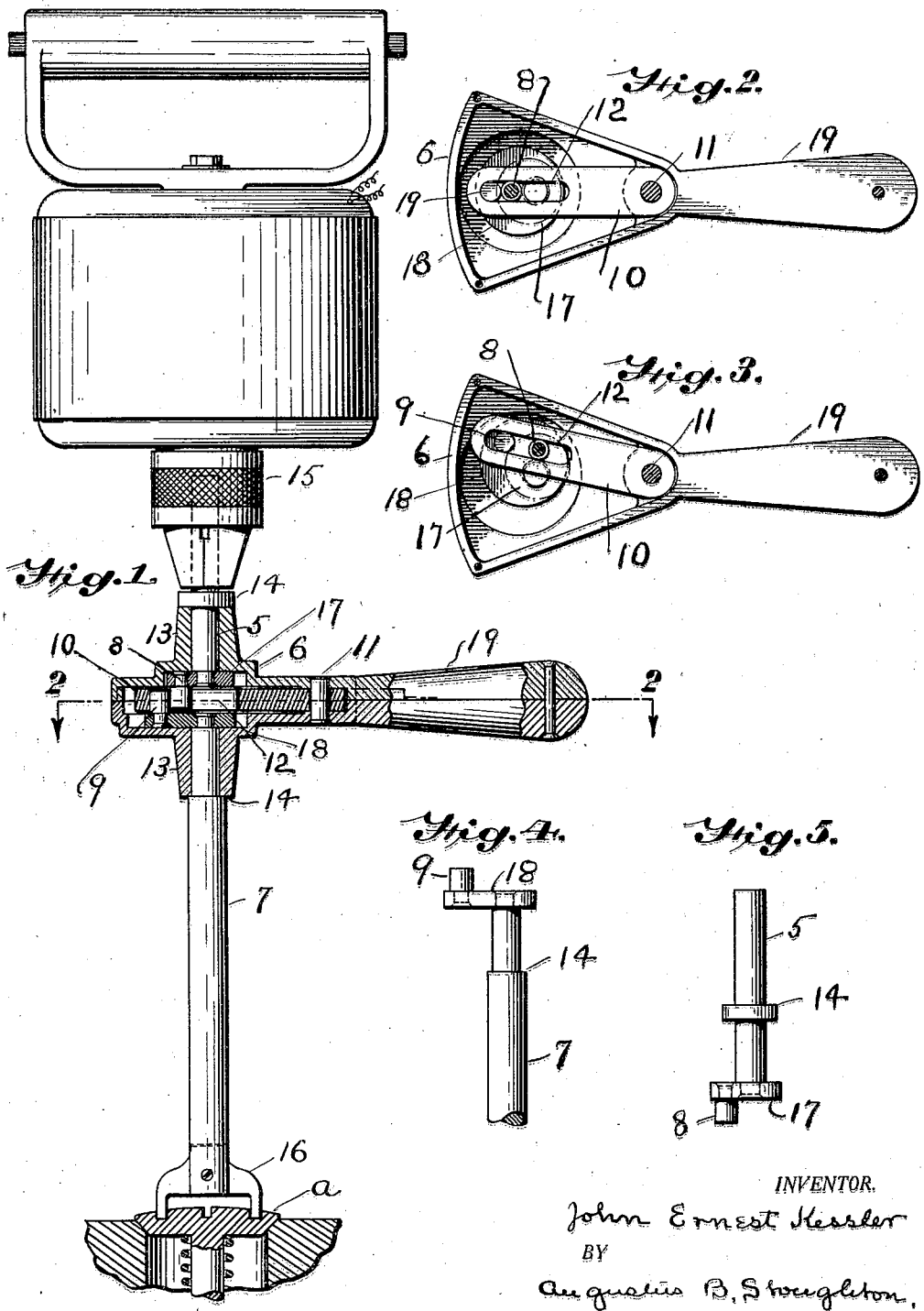

Patented Feb. 27, 1923.

1,446,975

UNITED STATES PATENT OFFICE.

JOHN ERNEST KESSLER, OF NORRISTOWN, PENNSYLVANIA.

VALVE GRINDER.

Application filed March 31, 1922. Serial No. 548,320.

*To all whom it may concern:*

Be it known that I, JOHN ERNEST KESSLER, a citizen of the United States, residing at Norristown, in the county of Montgomery and State of Pennsylvania, have invented a new and useful Improvement in Valve Grinders, of which the following is a specification.

In one of its aspects the principal object of the present invention is to provide a tool for use in grinding valves which shall be satisfactory and reliable in use and yet simple in construction and therefore inexpensive. In another of its aspects the object of the invention is to provide compact, simple, comparatively inexpensive and reliable mechanism for converting rotary motion into oscillating motion.

To these and other ends hereinafter stated, the invention may be said to comprise the combination of a rotating driving element or spindle, means for causing the driving element or spindle to make complete revolutions in the same direction, a follower element or spindle adapted to make partial revolutions in opposite directions, crank pins provided on each element or spindle and of which the radius of the driving element crank pin is less than the radius of the driven element crank pin, and a movable link having sliding crank pin connection to enable one element to make complete revolutions and the other element partial revolutions. The invention also comprises the improvements to be presently described and finally claimed.

In the accompanying drawings forming part hereof I have illustrated an embodiment of the invention selected from other embodiments for the sake of description and in those drawings—

Figure 1 is a side view, partly in section, of a valve grinder embodying features of the invention.

Figs. 2 and 3 are sectional views taken on the line 2—2 of Figure 1 and illustrating two positions of the parts, and Figs. 4 and 5 are views of the crank pins.

In the drawings 5 is a driving element or spindle mounted for rotation in the housing 6. 7 is a follower element or spindle also mounted for rotation in the housing 6. As shown these spindles or elements 5 and 7 are mounted in axial alignment. 8 is a crank pin provided on the spindle 5, and 9 is a crank pin provided on the spindle or element 7. The radius of the crank pin 9 in respect to the axis of oscillation of the spindle 7 is greater than the radius of the crank pin 8 in respect to the axis of rotation of the spindle 5. 10 is a movable link having sliding connection with each of the crank pins. The link 10 is shown as mounted within the housing and pivoted at 11 to afford it motion, and the link 10 is provided with a slot 12 within which both pins 8 and 9 are afforded sliding motion. The housing 6 is shown as made in two parts riveted together and as provided with hubs 13 which cooperate with collars or enlargements 14 on the spindles so as to take end thrust in the particular device shown in the drawing, and the housing is shown as provided with a handle 19 by which it is prevented from rotating. 15 is an electric drill which is one means for causing the driving element or spindle 5 to make complete revolutions. 16 is a driver attached to the spindle 7 and adapted to engage a valve as *a*, which it turns first in one direction for a part of a revolution and then in the other direction for a part of a revolution in order to grind it. The crank pins 8 and 9 are shown as mounted on disks 17 and 18 secured eccentrically to the ends of the spindles 5 and 7, and these disks are arranged in offsets provided in the housing halves. The wall of the offset for the disk 18 may be made to operate as an abutment or stop for limiting the turning movement of the disk 18 which, when present, is a matter of convenience in assembling the parts.

In use the crank pin 8 describes a circle and moves in the same direction and slides first in one direction and then in the other in the slot 12, thus swinging the link 10 back and forth on the pivot 11. The swinging motion thus imparted to the link is transmitted from the latter to the crank pin 9 which works in the slot 10 and so the pin 9 is moved back and forth in the arc of a circle and causes the spindle 7 to turn first in one direction and then in the other for a part of a revolution.

It will be obvious to those skilled in the art to which the invention relates that modifications may be made in details of construction and arrangement without departing from the spirit of the invention which is not limited as to those matters or otherwise than as the prior art and the appended claims may require.

I claim:

1. Mechanism for converting rotary motion into oscillating motion which comprises the combination of a rotating driving element, means for causing the driving element to make complete revolutions in the same direction, a follower element adapted to make partial revolutions in opposite directions, crank pins provided on each element and of which the radius of the driving element crank pin is less than the radius of the driven element crank pin, and a movable link having slidable crank pin connection to enable one element to make complete revolutions and the other element to make partial revolutions in opposite directions.

2. Valve grinder mechanism for converting rotary motion into oscillating motion which consists of the combination of a housing, a driving spindle mounted for rotation through a wall of the housing and provided within the housing with a crank pin, a follower spindle axially aligned with the first mentioned spindle and mounted for oscillation through a wall of the housing and provided within the housing with a crank pin arranged to reciprocate in the arc of a circle of larger diameter than the diameter of the circle of a revolution of the first mentioned pin, and a link pivotally mounted in the housing and having a slot in which both pins are slidably arranged.

3. Valve grinder mechanism for converting rotary motion into oscillating motion which comprises the combination of a housing, a driving spindle mounted for rotation through a wall of the housing and provided within the housing with a crank pin, a follower spindle axially aligned with the first mentioned spindle and mounted for oscillation through a wall of the housing and provided within the housing with a crank pin, and a link pivotally mounted in the housing and provided with a slot in which both pins are slidable.

4. In valve grinder mechanism for converting rotary motion into oscillating motion the combination of turnable spindles each provided with a crank pin, and a pivotally supported link having sliding connection for the pins.

JOHN ERNEST KESSLER.